United States Patent
Yoshiwara

(10) Patent No.: US 9,650,462 B2
(45) Date of Patent: May 16, 2017

(54) POLYMERIZABLE COMPOSITION, RESIN SHAPED ARTICLE, AND LAMINATE

(75) Inventor: Akihiko Yoshiwara, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 941 days.

(21) Appl. No.: 13/378,186

(22) PCT Filed: Jun. 15, 2010

(86) PCT No.: PCT/JP2010/060129
§ 371 (c)(1),
(2), (4) Date: Dec. 14, 2011

(87) PCT Pub. No.: WO2010/147116
PCT Pub. Date: Dec. 23, 2010

(65) Prior Publication Data
US 2012/0088879 A1   Apr. 12, 2012

(30) Foreign Application Priority Data

Jun. 15, 2009  (JP) ................................ 2009-141921
Sep. 30, 2009  (JP) ................................ 2009-229014

(51) Int. Cl.
| | |
|---|---|
| B60C 1/00 | (2006.01) |
| C08G 18/34 | (2006.01) |
| C08G 18/42 | (2006.01) |
| C08G 18/38 | (2006.01) |
| C08G 63/00 | (2006.01) |
| C08F 232/08 | (2006.01) |

(52) U.S. Cl.
CPC .................. *C08F 232/08* (2013.01)

(58) Field of Classification Search
USPC ....................................................... 524/495
See application file for complete search history.

(56) References Cited

U.S. PATENT DOCUMENTS

| | | |
|---|---|---|
| 2006/0211809 A1 | 9/2006 | Kodemura et al. |
| 2006/0211834 A1 | 9/2006 | Sugawara |
| 2007/0191563 A1 | 8/2007 | Sugawara |
| 2009/0036614 A1 | 2/2009 | Sugawara |
| 2011/0237718 A1 | 9/2011 | Yoshiwara |

FOREIGN PATENT DOCUMENTS

| | | |
|---|---|---|
| EP | 1408064 A1 | 4/2004 |
| JP | 3-126732 A | 5/1991 |
| JP | 2000-355881 A | 12/2000 |
| JP | 2003-082072 A | 3/2003 |
| JP | 2003-171479 A | 6/2003 |
| JP | 2004-244609 A | 9/2004 |
| JP | 2009-013306 A | 1/2009 |
| WO | 2005/012427 A1 | 2/2005 |
| WO | 2010/044461 A1 | 4/2010 |

OTHER PUBLICATIONS

International Search Report of PCT/JP2010/060129, mailing date Sep. 28, 2010.
Extended European Search Report dated Jan. 8, 2014, issued in corresponding European Patent Application No. 10789491.7 (6 pages).
Office Action dated Mar. 17, 2016, issued in counterpart European Patent Application No. 10789491.7. (5 pages).

*Primary Examiner* — Ling Choi
*Assistant Examiner* — Thuy-Ai N Nguyen
(74) *Attorney, Agent, or Firm* — Westerman, Hattori, Daniels & Adrian, LLP

(57) ABSTRACT

There is provided a polymerizable composition which contains a cycloolefin monomer; a metathesis polymerization catalyst; a cross-linking agent; and a compound (A) which has a carbon-carbon unsaturated bond and an active hydrogen reactable group or a combination of a compound (B1) which has an active hydrogen reactable group and a compound (B2) which has a carbon-carbon unsaturated bond.

18 Claims, No Drawings

POLYMERIZABLE COMPOSITION, RESIN SHAPED ARTICLE, AND LAMINATE

TECHNICAL FIELD

The present invention relates to a polymerizable composition and cross-linkable resin shaped article which are useful for the production of a cross-linked resin shaped article and laminate which are suitably used as a carbon fiber-reinforced composite material and relates to the cross-linked resin shaped article and laminate.

BACKGROUND ART

A carbon fiber-reinforced composite material which is comprised of carbon fiber and a matrix resin is light in weight and excellent in dynamic characteristics, so is being used for golf clubs, tennis rackets, fishing rods, and other sporting goods and also structural materials for aircraft, vehicles, etc., reinforcement of concrete structures, and other broad fields. Further, carbon fiber has conductivity, so the carbon fiber-reinforced composite material exhibits excellent electromagnetic shielding ability. It is being used for housings of notebook computers, video cameras, and other electrical and electronic equipment and is helpful in reducing the thickness of housings and lightening the weight of equipment.

As such a carbon fiber-reinforced composite material, for example, Patent Document 1 describes carbon fiber coated with a specific sizing agent having a vinylidene group and epoxy group, which is excellent in resin impregnation by an unsaturated polyester resin, vinyl ester resin, acryl resin, or other radical polymerized resin, which is further excellent in bond strength between these resins and carbon fiber, and which further gives a stable effect of improvement of physical properties, sheets of such carbon fiber, and a carbon fiber-reinforced resin composition which uses that carbon fiber as a reinforcing material. Patent Document 2 describes a carbon fiber-reinforced sheet shaped material containing unsaturated polyester as the main ingredient of the matrix resin, which has a smooth surface, and which is excellent in coatability. This literature describes that if mixing into a resin composition used for preparing the material, a polyisocyanate compound or a mixture of a polyisocyanate compound and a monoisocyanate compound, the impregnability of the resin composition into the carbon fiber is improved.

Further, Patent Document 3 describes a thermoplastic resin obtained by impregnating a polymerizable composition containing a norbornene-based monomer, metathesis polymerization catalyst, chain transfer agent, and cross-linking agent into a fiber material, then performing bulk polymerization and describes a cross-linked resin obtained by cross-linking that resin. As an example of the fiber material, carbon fiber is described.

In this regard, Patent Document 4 describes, relating to the carbon fiber-reinforced composite material such as described in Patent Document 3, that if a sizing agent is deposited on the carbon fiber, the polymerization of the norbornene-based monomer is blocked and there is a detrimental effect on the physical properties of the obtained thermoplastic resin and cross-linked resin and that, furthermore, a polymer comprised of a generally low polarity norbornene-based monomer bonds with the carbon fiber by the anchor effect, so it is preferable that there be no extra intermediate layer made of a sizing agent between the carbon fiber and that polymer as a matrix resin.

PRIOR ART DOCUMENTS

Patent Documents

Patent Document 1: Japanese Patent Publication (A) No. 2000-355881
Patent Document 2: Japanese Patent Publication (A) No. 2009-13306
Patent Document 3: Japanese Patent Publication (A) No. 2004-244609
Patent Document 4: Japanese Patent Publication (A) No. 2003-171479

DISCLOSURE OF THE INVENTION

Problem to be Solved by the Invention

The present invention has as its object the provision of a polymerizable composition and cross-linkable resin shaped article which are excellent in impregnability by a matrix resin of a cycloolefin polymer, which are excellent in adhesion of the matrix resin and carbon fiber, which are high in mechanical strength, which are excellent in heat resistance as well, and which are useful for the production of a cross-linked resin shaped article and laminate which are suitable for use as a carbon fiber-reinforced composite material and the provision of such a cross-linked resin shaped article and laminate.

Means for Solving the Problems

A cycloolefin polymer such as a norbornene-based polymer is known to be excellent in heat resistance, high in mechanical strength, and also excellent in electrical property and is promising as a matrix resin of a carbon fiber-reinforced composite material. On the other hand, Patent Document 4 teaches that in producing a carbon fiber-reinforced composite material by using a polymer comprised of a generally low polarity norbornene-based monomer as a matrix resin and impregnating carbon fiber with the same, the amount of sizing agent which is deposited on the carbon fiber should be reduced as much as possible.

Therefore, the present inventor engaged in an intensive study with the main object of improving the adhesion between the matrix resin and carbon fiber in the case of using carbon fiber on which no sizing agent is deposited for the carbon fiber-reinforced composite material described in Patent Document 3, whereupon it was discovered that by adding to the above system a compound which has a cross-linkable carbon-carbon unsaturated bond group such as a methacryl group and an active hydrogen reactable group such as an isocyanate group, the adhesion is improved and a carbon fiber-reinforced composite material which has the desired physical properties is obtained. Furthermore, it was discovered that this effect surprisingly is further improved when using carbon fiber on which a sizing agent is deposited. The present inventor completed the present invention based on this discovery.

That is, according to the present invention, there are provided:

[1] A polymerizable composition which contains a cycloolefin monomer; a metathesis polymerization catalyst; a cross-linking agent; and a compound (A) which has a carbon-carbon unsaturated bond and an active hydrogen reactable group or a combination of a compound (B1) which has an active hydrogen reactable group and a compound (B2) which has a carbon-carbon unsaturated bond,

[2] The polymerizable composition as set forth in [1], wherein the compound (B1) which has an active hydrogen reactable group is a compound which has at least two active hydrogen reactable groups, and the compound (B2) which has a carbon-carbon unsaturated bond is a compound which has a carbon-carbon unsaturated bond and a hydroxyl group,

[3] The polymerizable composition as set forth in [1] or [2], wherein the active hydrogen reactable group of the compound (A) is an isocyanate group,

[4] The polymerizable composition as set forth in any one of [1] to [3], wherein the active hydrogen reactable group of the compound (B1) is an isocyanate group,

[5] The polymerizable composition as set forth in any one of [2] to [4], wherein a ratio of presence of the active hydrogen reactable group of the compound (B1) and the hydroxyl group of the compound (B2) is, by value of molar ratio (active hydrogen reactable groups of compound (B1)/hydroxyl groups of compound (B2)), 1 to 20,

[6] The polymerizable composition as set forth in any one of [1] to [5], further containing a cross-linking aid,

[7] The polymerizable composition as set forth in [6], wherein a mixing ratio of the cross-linking aid and the compound (A) or the compound (B2) is, by value of weight ratio (cross-linking aid/compound (A) or compound (B2)), 0.001 to 1,000

[8] The polymerizable composition as set forth in any one of [1] to [7], further containing a chain transfer agent,

[9] The polymerizable composition as set forth in any one of [1] to [8], further containing carbon fiber,

[10] The polymerizable composition as set forth in [9], wherein the carbon fiber is deposited with a sizing agent in advance,

[11] A cross-linkable resin shaped article obtained by impregnating the polymerizable composition as set forth in any one of [1] to [8] in carbon fiber, then bulk polymerizing the same,

[12] A cross-linkable resin shaped article obtained by bulk polymerizing the polymerizable composition as set forth in [9] or [10],

[13] A cross-linked resin shaped article obtained by further cross-linking the cross-linkable resin shaped article as set forth in [11] or [12], and

[14] A laminate obtained by laminating at least the cross-linkable resin shaped article as set forth in [11] or [12] or the cross-linked resin shaped article as set forth in [13].

Effects of the Invention

According to the present invention, it is possible to provide a polymerizable composition and cross-linkable resin shaped article which are excellent in impregnability with the matrix resin of the cycloolefin polymer, which are excellent in adhesion of the matrix resin and carbon fiber, which are high in mechanical strength, which are excellent also in heat resistance, and which are useful for the production of a cross-linked resin shaped article and laminate which are suitably used as a carbon fiber-reinforced composite material and to provide such a cross-linked resin shaped article and laminate.

DESCRIPTION OF EMBODIMENTS

[Polymerizable Composition]

The polymerizable composition of the present invention includes a cycloolefin monomer; a metathesis polymerization catalyst; a cross-linking agent; and a compound (A) which has a carbon-carbon unsaturated bond and an active hydrogen reactable group or a combination of a compound (B1) which has an active hydrogen reactable group and a compound (B2) which has a carbon-carbon unsaturated bond.

(Cycloolefin Monomer)

The cycloolefin monomer which is used in the present invention is a compound which has a ring structure formed by carbon atoms and has one polymerizable carbon-carbon double bond in the ring structure. In the present Description, a "polymerizable carbon-carbon double bond" means a carbon-carbon double bond enabling chain polymerization (metathesis ring-opening polymerization).

As the ring structure of the cycloolefin monomer, a monocyclic structure, polycyclic structure, condensed polycyclic structure, bridge ring, and combination polycyclic structure of these etc. may be mentioned. The number of carbon atoms which form each ring structure is not particularly limited, but is usually 4 to 30, preferably 5 to 20, more preferably 5 to 15.

The cycloolefin monomer may have as a substituent an alkyl group, alkenyl group, alkylidene group, aryl group, and other C1 to C30 hydrocarbon group; and carboxyl group, acid anhydride group, and other polar group.

As the cycloolefin monomer, either a monocyclic cycloolefin monomer or a polycyclic cycloolefin monomer may be used. Among these, from the viewpoint of improving the mechanical strength of the obtained cross-linked resin, a polycyclic cycloolefin monomer is preferable. As a polycyclic cycloolefin monomer, in particular a norbornene-based monomer is preferable. A "norbornene-based monomer" means a cycloolefin monomer which has a norbornene ring structure in its molecule. As a norbornene-based monomer, for example, norbornenes, dicyclopentadienes, tetracyclododecenes, etc. may be mentioned.

Below, cycloolefin monomers will be further explained divided into ones which do not have cross-linkable carbon-carbon unsaturated bonds and ones which have one or more cross-linkable carbon-carbon unsaturated bonds. In the present Description, a "cross-linkable carbon-carbon unsaturated bond" means a carbon-carbon unsaturated bond which does not participate in metathesis ring opening polymerization but which participates in a cross-linking reaction. A "cross-linking reaction" is a reaction which forms a cross-linked structure, and in the present invention, usually this means a radical cross-linking reaction or metathesis cross-linking reaction, in particular a radical cross-linking reaction.

As a cross-linkable carbon-carbon unsaturated bond, a carbon-carbon unsaturated bond other than an aromatic carbon-carbon unsaturated bond, that is, an aliphatic carbon-carbon double bond or triple bond, may be mentioned. Among these as well, an aliphatic carbon-carbon double bond is preferable. These aliphatic carbon-carbon double bonds can exist as vinyl groups ($CH_2=CH—$), vinylidene groups ($CH_2=C<$), or vinylene groups ($—CH=CH—$) and from the viewpoint of exhibiting good radical cross-linkability, presence as vinyl groups and/or vinylidene groups is preferable, while presence as vinylidene groups is more preferable. Among the cycloolefin monomers which have one or more cross-linkable carbon-carbon unsaturated bonds, the positions of the unsaturated bonds are not particularly limited. In addition to the insides of the ring structures formed by carbon atoms, the bonds may be at any positions outside the ring structures, for example, at the terminal ends or insides of the side chains.

As cycloolefin monomers which do not have cross-linkable carbon-carbon unsaturated bonds, for example, cyclopentene, 3-methylcyclopentene, 4-methylcyclopentene, 3,4-dimethylcyclopentene, 3,5-dimethylcyclopentene, 3-chlorocyclopentene, cyclohexene, 3-methylcyclohexene, 4-methylcyclohexene, 3,4-dimethylcyclohexene, 3-chlorocyclohexene, cycloheptene, and other monocyclic cycloolefin monomers; norbornene, 5-methylnorbornene, 5-ethylnorbornene, 5-propylnorbornene, 5,6-dimethylnorbornene, 1-methylnorbornene, 7-methylnorbornene, 5,5,6-trimethylnorbornene, 5-phenylnorbornene, tetracyclododecene (TCD), 2-methyl-1,4,5,8-dimethano-1,2,3,4,4a,5, 8,8a-octahydronaphthalene, 2-ethyl-1,4,5,8-dimethano-1,2,3,4, 4a,5,8,8a-octahydronaphthalene, 2,3-dimethyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-ethylidene-1,4,5,8-dimethano-1,2,3,4,4a, 5,8,8a-octahydronaphthalene, 2-fluoro-1,4,5,8-dimethano-1,2,3,4,4a,5,8,8a-octahydronaphthalene, 1,5-dimethyl-1,4,5, 8-dimethano-1,2,3,4,4a,5,8,8a-octahydronaphthalene, 2-cyclohexyl-1,4,5,8-dimethano-1,2,3,4,4a,5,8,8a-octahydronaphthalene, 2,3-dichloro-1,4,5,8-dimethano-1,2,3,4,4a, 5,8,8a-octahydronaphthalene, 2-isobutyl-1,4,5,8-dimethano-1,2,3,4,4a,5,8,8a-octahydronaphthalene, 1,2-dihydrodicyclopentadiene, 5-chloronorbornene, 5,5-dichloronorbornene, 5-fluoronorbornene, 5,5,6-trifluoro-6-trifluoromethylnorbornene, 5-chloromethylnorbornene, 5-methoxynorbornene, 5,6-dicarboxylnorbornene anhydrate, 5-dimethylaminonorbornene, 5-cyanonorbornene, and other norbornene-based monomers; etc. may be mentioned. Among these, norbornene-based monomers which do not have cross-linkable carbon-carbon unsaturated bonds are preferable.

As the cycloolefin monomers which have one or more cross-linkable carbon-carbon unsaturated bonds, for example, 3-vinylcyclohexene, 4-vinylcyclohexene, 1,3-cyclopentadiene, 1,3-cyclohexadiene, 1,4-cyclohexadiene, 5-ethyl-1,3-cyclohexadiene, 1,3-cycloheptadiene, 1,3-cyclooctadiene, and other monocyclic cycloolefin monomers; 5-ethylidene-2-norbornene, 5-methylidene-2-norbornene, 5-isopropylidene-2-norbornene, 5-vinylnorbornene, 5-allylnorbornene, 5,6-diethylidene-2-norbornene, dicyclopentadiene, 2,5-norbornadiene, and other norbornene-based monomers; etc. may be mentioned. Among these, norbornene-based monomers which have one or more cross-linkable carbon-carbon unsaturated bonds are preferable.

The above cycloolefin monomers may be used alone or in combinations of two or more types. For example, as the cycloolefin monomer, a mixture of a cycloolefin monomer which has one or more cross-linkable carbon-carbon unsaturated bonds and a cycloolefin monomer which does not have cross-linkable carbon-carbon unsaturated bonds may be used.

As the cycloolefin monomers which are used in the present invention, inclusion of cycloolefin monomers which have one or more cross-linkable carbon-carbon unsaturated bonds is preferable in that the obtained cross-linked resin shaped article is improved in heat resistance and mechanical strength.

Among the cycloolefin monomers which are mixed in the polymerizable composition of the present invention, the mixing ratio of the cycloolefin monomers which have one or more cross-linkable carbon-carbon unsaturated bonds and the cycloolefin monomers which do not have cross-linkable carbon-carbon unsaturated bonds may be suitably selected as desired, but the weight ratio (cycloolefin monomers which have one or more cross-linkable carbon-carbon unsaturated bonds/cycloolefin monomers which do not have cross-linkable carbon-carbon unsaturated bonds) is usually 5/95 to 100/0, preferably 10/90 to 95/10, more preferably 15/85 to 90/15 in range. If that mixing ratio is in that range, in the obtained cross-linked resin shaped article, the heat resistance and mechanical strength and the adhesion of the matrix resin of the cycloolefin polymer and the carbon fiber are highly balanced, so this is preferred.

Note that the polymerizable composition of the present invention may also contain any monomer which is copolymerizable with the above cycloolefin monomers so long as the expression of the effect of the present invention is not inhibited.

(Metathesis Polymerization Catalyst)

The metathesis polymerization catalyst which is used in the present invention is not particularly limited so long as enabling metathesis ring-opening polymerization of the above cycloolefin monomers.

As the metathesis polymerization catalyst, a complex comprised of a transition metal atom at the center around which a plurality of ions, atoms, polyatomic ions, and/or compounds are bonded may be mentioned. As the transition metal atoms, atoms of Group V, Group VI, and Group VIII (Long Periodic Table, same below) are used. The atoms of the groups are not particularly limited, but as the atoms of Group V, preferably tantalum may be mentioned, as the atoms of Group VI, preferably molybdenum and tungsten may be mentioned, and as the atoms of Group VIII, preferably ruthenium and osmium may be mentioned.

Among these, it is preferable to use a complex of ruthenium or osmium of Group VIII as a metathesis polymerization catalyst, while a ruthenium carbene complex is particularly preferable. A ruthenium carbene complex is excellent in catalyst activity at the time of bulk polymerization, so is excellent in productivity of the cross-linkable resin and can give a cross-linkable resin with little of the odor derived from residual unreacted monomers. Further, a complex of ruthenium or osmium of Group VIII is relatively stable against oxygen and moisture in the air and does not easily lose activity, so production of a cross-linkable resin is possible even in the air.

As specific examples of a ruthenium carbene complex, a complex of the following formula (1) or formula (2) may be mentioned.

[Chemical 1]

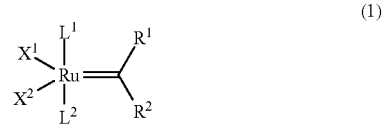

(1)

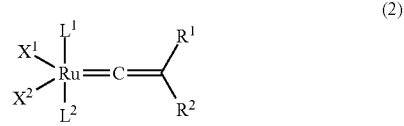

(2)

In formula (1) and (2), $R^1$ and $R^2$ independently express a hydrogen atom, halogen atom, or cyclic or chain C1 to C20 hydrocarbon group which may contain a halogen atom, oxygen atom, nitrogen atom, sulfur atom, phosphorus atom, or silicon atom. $X^1$ and $X^2$ independently show an arbitrary anionic ligand. $L^1$ and $L^2$ independently express a hetero atom-containing carbene compound or neutral electron donor compound other than a hetero atom-containing carbene compound. Further, $R^1$ and $R^2$ may bond with each other to form an aliphatic ring or aromatic ring which may include a hetero atom. Furthermore, $R^1$, $R^2$, $X^1$, $X^2$, $L^1$, and $L^2$ may bond together in any combination to form a multidentate chelating ligand.

A "hetero atom" means an atom of Group XV and Group XVI of the Periodic Table. As specific examples of a hetero atom, a nitrogen atom (N), oxygen atom (O), phosphorus atom (P), sulfur atom (S), arsenic atom (As), selenium atom (Se), etc. may be mentioned. Among these, from the viewpoint that a stable carbene compound is obtained, N, O, P, S, etc. are preferable, while N is particularly preferable.

As a hetero atom-containing carbene compound, one comprising a carbene carbon at the two sides of which hetero atoms adjoin and bond is preferable, Furthermore, one where a hetero ring is formed including the carbene carbon atom and the hetero atoms at its two sides is more preferable. Further, one having a bulky substituent at a hetero atom adjoining the carbene carbon is preferable.

As the hetero atom-containing carbene compound, a compound of the following formula (3) or formula (4) may be mentioned.

[Chemical 2]

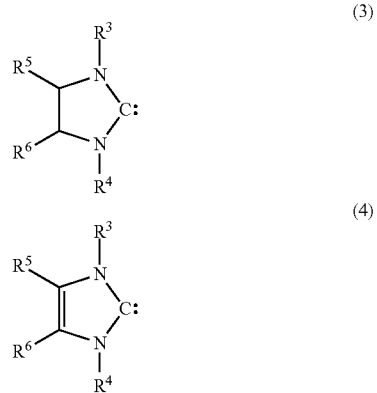

In formula (3) or formula (4), $R^3$ to $R^6$ independently express a hydrogen atom, halogen atom, or cyclic or chain C1 to C20 hydrocarbon group which may contain a halogen atom, oxygen atom, nitrogen atom, sulfur atom, phosphorus atom, or silicon atom. Further, $R^3$ to $R^6$ may bond together in any combination to form a ring.

As specific examples of the compound expressed by the formula (3) or formula (4), 1,3-dimesitylimidazolidin-2-ylidene, 1,3-di(1-adamantyl) imidazolidin-2-ylidene, 1-cyclohexyl-3-mesitylimidazolidin-2-ylidene, 1,3-dimesityloctahydrobenzimidazol-2-ylidene, 1,3-diisopropyl-4-imidazolin-2-ylidene, 1,3-di(1-phenylethyl)-4-imidazolin-2-ylidene, 1,3-dimesityl-2,3-dihydrobenzimidazol-2-ylidene, etc. may be mentioned.

Further, in addition to a compound shown in the formula (3) or formula (4), 1,3,4-triphenyl-2,3,4,5-tetrahydro-1H-1,2,4-triazol-5-ylidene, 1,3-dicyclohexylhexahydropyrimidin-2-ylidene, N,N,N',N'-tetraisopropylformamidinylidene, 1,3,4-triphenyl-4,5-dihydro-1H-1,2,4-triazol-5-ylidene, 3-(2,6-diisopropylphenyl)-2,3-dihydrothiazol-2-ylidene, and other hetero atom-containing carbene compounds may be used.

In the formula (1) and formula (2), the anionic (negative ionic) ligands $X^1$ and $X^2$ are ligands which have a negative charge when pulled away from the center metal atom. For example, a fluorine atom (F), a chlorine atom (Cl), a bromine atom (Br), an iodine atom (I), and other halogen atoms, a diketonate group, substituted cyclopentadienyl group, alkoxy group, aryloxy group, carboxyl group, etc. may be mentioned. Among these, a halogen atom is preferable, while a chlorine atom is more preferable.

Further, the neutral electron donor compound may be any compound so long as a ligand which has a neutral charge when pulled away from the center metal. As specific examples, carbonyls, amines, pyridines, ethers, nitriles, esters, phosphines, thioethers, aromatic compounds, olefins, isocyanides, thiocyanates, etc. may be mentioned. Among these, phosphines, ethers, and pyridines are preferable, while trialkyl phosphine is more preferable.

As the complex compound which is expressed by the formula (1), benzylidene(1,3-dimesityl-4-imidazolidin-2-ylidene)(tricyclohexyl phosphine) ruthenium dichloride, benzylidene(1,3-dimesityl-4,5-dibromo-4-imidazolin-2-ylidene)(tricyclohexylphosphine)ruthenium dichloride, (1,3-dimesityl-4-imidazolin-2-ylidene)(3-phenyl-1H-inden-1-ylidene) (tricyclohexylphosphine)ruthenium dichloride, (1,3-dimesityl-4-imidazolidin-2-ylidene)(3-methyl-2-buten-1-ylidene) (tricyclopentylphosphine)ruthenium dichloride, benzylidene(1,3-dimesityloctahydrobenzimidazol-2-ylidene)(tricyclohexylphosphine) ruthenium dichloride, benzylidene[1,3-di(1-phenylethyl)-4-imidazolin-2-ylidene](tricyclohexylphosphine)ruthenium dichloride, benzylidene (1,3-dimesityl-2,3-dihydrobenzimidazol-2-ylidene)(tricyclohexylphosphine) ruthenium dichloride, benzylidene (tricyclohexylphosphine)(1,3,4-triphenyl-2,3,4,5-tetrahydro-1H-1,2,4-triazol-5-ylidene)ruthenium dichloride, (1,3-diisopropylhexahydropyrimidin-2-ylidene) (ethoxymethylene)(tricyclohexylphosphine)ruthenium dichloride, benzylidene(1,3-dimesityl-4-imidazolidin-2-ylidene)pyridine ruthenium dichloride, (1,3-dimesityl-4-imidazolidin-2-ylidene)(2-phenylethylidene) (tricyclohexylphosphine) ruthenium dichloride, (1,3-dimesityl-4-imidazolin-2-ylidene)(2-phenylethylidene)(tricyclohexylphosphine) ruthenium dichloride, (1,3-dimesityl-4,5-dibromo-4-imidazolin-2-ylidene) [(phenylthio)methylene](tricyclohexylphosphine)ruthenium dichloride, (1,3-dimesityl-4,5-dibromo-4-imidazolin-2-ylidene)(2-pyrrolidone-1-ylmethylene)(tricyclohexylphosphine)ruthenium dichloride, and other ruthenium complex compounds to which one hetero atom-containing carbene compound and one neutral electron donor compound are bonded;

benzylidene bis(tricyclohexylphosphine)ruthenium dichloride, (3-methyl-2-buten-1-ylidene)bis(tricyclopentylphosphine)ruthenium dichloride, and other ruthenium complex compounds to which two neutral electron donor compounds are bonded;

benzylidene bis(1,3-dicyclohexyl-4-imidazolidin-2-ylidene) ruthenium dichloride, benzylidene bis(1,3-diisopropyl-4-imidazolidin-2-ylidene) ruthenium dichloride, and other ruthenium complex compounds to which two hetero atom-containing carbene compounds are bonded; etc. may be mentioned.

As the complex compounds expressed by the formula (2), (1,3-dimesityl-4-imidazolidin-2-ylidene)(phenylvinylidene) (tricyclohexyl phosphine) ruthenium dichloride, (t-butylvinylidene)(1,3-diisopropyl-4-imidazolin-2-ylidene)(tricyclopentylphosphine)ruthenium dichloride, bis(1,3-dicyclohexyl-4-imidazolin-2-ylidene)phenylvinylidene ruthenium dichloride, etc. may be mentioned.

Among these complex compounds, ones which are expressed by the formula (1) and have one compound expressed by the formula (4) as a ligand is most preferable.

The amount of use of the metathesis polymerization catalyst is, by molar ratio of the (metal atoms in catalyst: cycloolefin monomer), usually 1:2,000 to 1:2,000,000, preferably 1:5,000 to 1:1,000,000, more preferably 1:10,000 to 1:500,000 in range.

The metathesis polymerization catalyst may, if desired, be used dissolved or suspended in a small amount of an inert activator. As such a solvent, n-pentane, n-hexane, n-heptane, liquid paraffin, mineral spirits, and other chain aliphatic hydrocarbons; cyclopentane, cyclohexane, methylcyclohexane, dimethylcyclohexane, trimethylcyclohexane, ethylcyclohexane, diethylcyclohexane, decahydronaphthalene, dicycloheptane, tricyclodecane, hexahydroindene, cyclooctane, and other alicyclic hydrocarbons; benzene, toluene, xylene, and other aromatic hydrocarbons; nitromethane, nitrobenzene, acetonitrile, and other nitrogen-containing hydrocarbons; diethylether, tetrahydrofuran, and other oxygen-containing hydrocarbons; etc. may be mentioned. Among these, use of industrially commonly used aromatic hydrocarbons, aliphatic hydrocarbons and alicyclic hydrocarbons is preferable. Further, if not causing a drop in activity as a metathesis polymerization catalyst, a liquid antiaging agent, a liquid plasticizer, or a liquid elastomer may also be used as a solvent.

The metathesis polymerization catalyst may be used together with an activator (co-catalyst) for the purpose of controlling the polymerization activity and improving the polymerization reaction rate. As the activator, alkylides, halides, alkoxides, aryloxides, etc. of aluminum, scandium, and tin etc. may be mentioned.

As the activator, trialkoxy aluminum, triphenoxy aluminum, dialkoxyalkyl aluminum, alkoxydialkyl aluminum, trialkyl aluminum, dialkoxy aluminum chloride, alkoxyalkyl aluminum chloride, dialkyl aluminum chloride, trialkoxy scandium, tetraalkoxy titanium, tetraalkoxy tin, tetraalkoxy zirconium, etc. may be mentioned.

The amount of the activator used is, by molar ratio of (metal atoms in catalyst:activantor), usually 1:0.05 to 1:100, preferably 1:0.2 to 1:20, more preferably 1:0.5 to 1:10 in range.

Further, when using as the metathesis polymerization catalyst a Group V and Group VI transition metal atom complex, the metathesis polymerization catalyst and activator are both preferably used dissolved in a monomer, but if in a range not inherently detracting from the properties of the product, use suspended or dissolved in a small amount of a solvent is also possible.

(Cross-Linking Agent)

The cross-linking agent which is used in the present invention is used for the purpose of causing a cross-linking reaction in a polymer obtained by subjecting the polymerizable composition of the present invention to a polymerization reaction. Therefore, the polymer can become an efficiently post-cross-linkable thermoplastic resin. Here, "post-cross-linkable" means when heating the resin, a cross-linking reaction proceeds and a cross-linked resin can be obtained. The cross-linkable resin shaped article of the present invention having the above polymer as a matrix resin melts by heating and is high in viscosity, so holds its shape, while when brought into contact with any member, exhibits moldability at its surface to the shape of that member and finally cross-links to cure. These characteristics of the cross-linkable resin shaped article of the present invention are believed to contribute to improvement of the interlayer adhesion in a laminate obtained by stacking the cross-linkable resin shaped articles of the present invention, then heating them to melt and cross-linking them.

In the present invention, as a cross-linking agent, usually a radical generator is preferably used. As a radical generator, for example, an organic peroxide, diazo compound, nonpolar radical generator, etc. may be mentioned. Preferably it is an organic peroxide or a nonpolar radical generator.

As the organic peroxide, for example, t-butyl hydroperoxide, p-menthane hydroperoxide, cumen hydroperoxide, and other hydroperoxides; dicumyl peroxide, t-butylcumyl peroxide, α,α'-bis(t-butylperoxy-m-isopropyl)benzene, di-t-butyl peroxide, 2,5-dimethyl-2,5-di(t-butylperoxy)-3-hexine, 2,5-dimethyl-2,5-di(t-butylperoxy) hexane, and other dialkyl peroxides; dipropionyl peroxide, benzoyl peroxide, and other diacyl peroxides; 2,2-di(t-butyl peroxy) butane, 1,1-di(t-hexylperoxy)cyclohexane, 1,1-di(t-butylperoxy)-2-methylcyclohexane, 1,1-di(t-butylperoxy) cyclohexane, and other peroxy ketals; t-butyl peroxyacetate, t-butyl peroxybenzoate, and other peroxy esters; t-butyl peroxyisopropyl carbonate, di(isopropylperoxy)dicarbonate, and other peroxy carbonates; t-butyltrimethylsilyl peroxide and other alkylsilyl peroxides; 3,3,5,7,7-pentamethyl-1,2,4-trioxepane, 3,6,9-triethyl-3,6,9-trimethyl-1,4,7-triperoxonane, 3,6-diethyl-3,6-dimethyl-1,2,4,5-tetraxane, and other cyclic peroxides; may be mentioned. Among these, from the viewpoint of little hindrance to metathesis polymerization reactions, dialkyl peroxides, peroxy ketals, and cyclic peroxides are preferable.

As the diazo compound, for example, 4,4'-bisazidebenzal (4-methyl) cyclohexanone, 2,6-bis(4'-azidobenzal)cyclohexanone, etc. may be mentioned.

As the nonpolar radical generator, 2,3-dimethyl-2,3-diphenylbutane, 3,4-dimethyl-3,4-diphenylhexane, 1,1,2-triphenylethane, 1,1,1-triphenyl-2-phenylethane, etc. may be mentioned.

When the cross-linking agent which is used in the present invention is a radical generator, its one-minute half-life temperature is suitably selected according to the conditions of curing (cross-linking of the polymer obtained by subjecting the polymerizable composition of the present invention to a polymerization reaction), but is usually 100 to 300° C., preferably 120 to 250° C., more preferably 150 to 230° C. in range. Here, the "one-minute half-life temperature" is the temperature for half of the amount of the radical generator to decompose in one minute. For the one-minute half-life temperature of a radical generator, for example, refer to the catalogs or homepages of the radical generator manufacturers (for example, NOF Corporation).

The radical generator may be used alone or in combinations of two or more types. The amount of the radical generator which is blended into the polymerizable composition of the present invention is, with respect to 100 parts by weight of the cycloolefin monomer, usually 0.01 to 10 parts by weight, preferably 0.1 to 10 parts by weight, more preferably 0.5 to 5 parts by weight in range.

[Compound (A), Compound (B1), and Compound (B2)]

In the present invention, the compound (A) which has a carbon-carbon unsaturated bond and active hydrogen reactable group or a combination of the compound (B1) which has an active hydrogen reactable group and the compound (B2) which has a carbon-carbon unsaturated bond is used. These compounds are guessed to function as agents improving adhesion or agents imparting adhesion between the matrix resin of the cycloolefin polymer and carbon fiber in the obtained resin shaped article etc.

First, the case of using the compound (A) which has a carbon-carbon unsaturated bond and active hydrogen reactable group (below, suitably "compound (A)") alone will be explained.

In the present Description, the "carbon-carbon unsaturated bond" in the compound (A) and compound (B2) means a carbon-carbon unsaturated bond other than an aromatic carbon-carbon unsaturated bond, that is, an aliphatic carbon-carbon double bond or triple bond. Such a carbon-carbon unsaturated bonds may be cross-linkable or polymerizable.

Further, the "active hydrogen reactable group" means a group which can react with a functional group which has an active hydrogen. Here, "active hydrogen" means a hydrogen atom which is bonded to a hetero atom. As the active hydrogen reactable group in the present invention, a group which at least can react with a carboxyl group or hydroxyl group having an active hydrogen is preferable.

In the present invention, the compounds which have carbon-carbon unsaturated bonds and active hydrogen reactable groups are all "compounds (A)". For example, in the case of a compound which has two or more carbon-carbon unsaturated bonds, sometimes functions similar to those of the later explained cross-linking aids are exhibited, but if the compounds are compounds which have carbon-carbon unsaturated bonds and active hydrogen reactable groups, they fall under "compounds (A)".

The compound (A) is believed to strongly bond the matrix resin of the cycloolefin polymer and carbon fiber (or sizing agent deposited on the carbon fiber) by physical and/or chemical bonds due to its carbon-carbon unsaturated bonds and active hydrogen reactable groups and also to improve the wettability of the polymerizable composition containing the cycloolefin monomer to carbon fiber and promote uniform impregnation of the polymerizable composition to carbon fiber.

The carbon-carbon unsaturated bonds may, for example, be present as vinyl groups ($H_2C=CH-$) vinylidene groups ($H_2C=C<$), or vinylene groups ($-CH=CH-$). Vinyl groups, vinylidene groups, and vinylene groups may be substituted by any substituent (for example, methyl groups, ethyl groups, phenyl groups, and other C1 to C20 hydrocarbon groups which may also contain hetero atoms). As specific examples of vinylidene groups, acryl groups and methacryl groups [below, acryl groups and methacryl groups sometimes referred to as "(meth)acryl groups"] may be mentioned. A carbon-carbon unsaturated bond, from the viewpoint of improving the affinity of the matrix resin of the cycloolefin polymer and the compound (A), is preferably present as a vinyl group and/or (meth)acryl group and is more preferably present as a methacryl group.

As the active hydrogen reactable group, for example, an epoxy group, glycidyl group, oxetane group, lactone group, oxazoline group, carbodiimide group, aziridine group, imide group, isocyanate group, acid anhydride group, hydrosilyl group, halogen substituted silyl group, etc. may be mentioned. As the hydrosilyl group, for example, a dimethylvinylsilane group or dimethylallylsilane group may be mentioned. As the halogen substituted silyl group, for example, a dimethylvinyl chlorosilane group or dimethylallyl chlorosilane group may be mentioned. As the active hydrogen reactable group, from the viewpoint of improving the affinity of the compound (A) with carbon fiber or a sizing agent, an epoxy group, glycidyl group, oxetane group, lactone group, oxazoline group, isocyanate group, and acid anhydride group are preferable, an epoxy group, glycidyl group, and isocyanate group are more preferable, and an isocyanate group is particularly preferable.

In the compound (A), it is sufficient that there be at least one carbon-carbon unsaturated bond and one active hydrogen reactable group. If there are a plurality present, these may be the same in type or may be different in type. Note that the numbers of carbon-carbon unsaturated bonds and active hydrogen reactable groups present in the compound (A) are usually 1 to 20, preferably 1 to 10. The compound (A) may be a single molecule or a polymer.

As the compound (A), from the viewpoint of improving the adhesion between the matrix resin of the cycloolefin polymer and the carbon fiber, the compound is suitably one which has a carbon-carbon unsaturated bond group and active hydrogen reactable group. The "carbon-carbon unsaturated bond group" means a group of atoms including carbon-carbon unsaturated bonds, that is, aliphatic double bonds or triple bonds. Among these, as the compound (A), the carbon-carbon unsaturated bond group is preferably a vinyl group and/or (meth)acryl group, while the active hydrogen reactable group is preferably at least one group selected from the group comprised of an epoxy group, glycidyl group, and isocyanate group. The carbon-carbon unsaturated bond group is more preferably a methacryl group, while the active hydrogen reactable group is more preferably an isocyanate group.

As specific examples of the compound (A), methacryloxyglycidyl ether, acryloxyglycidyl ether and other compounds having a (meth)acryl group and epoxy group; oxetane acrylate, oxetane methacrylate and other compounds which have a (meth)acryl group and oxetane group; lactone acrylate, lactone methacrylate and other compounds which have a (meth)acryl group and lactone group; vinyl oxazoline, isopropenyl oxazoline and other compounds which have a vinyl group and oxazoline group; and isocyanate methylacrylate, isocyanate methyl methacrylate, 2-isocyanate ethylacrylate, 2-isocyanate ethyl methacrylate, and other compounds which have a (meth)acryl group and isocyanate group may be mentioned. Further, for example, an oligomer of a compound which has a (meth)acryl group and isocyanate group etc. may be mentioned. In addition, methacrylic anhydride, acrylic anhydride, anhydrous maleate, and vinylmaleic anhydride, and other compounds which have a vinyl group or vinylene group and acid anhydride group etc. may be mentioned. Among these, methacryloxyglycidyl ether, acryloxyglycidyl ether, isocyanate methylacrylate, isocyanate methyl methacrylate, vinyl oxazoline, 2-isocyanate ethyl acrylate, 2-isocyanate ethyl methacrylate, and their oligomers are preferable, while isocyanate methyl methacrylate, 2-isocyanate ethyl methacrylate, and their oligomers are particularly preferable. As the oligomer, for example, a compound expressed by the following chemical formula may be mentioned. In the chemical formula, n is an integer satisfying n>1 with an upper limit of normally 16.

[Chemical 3]

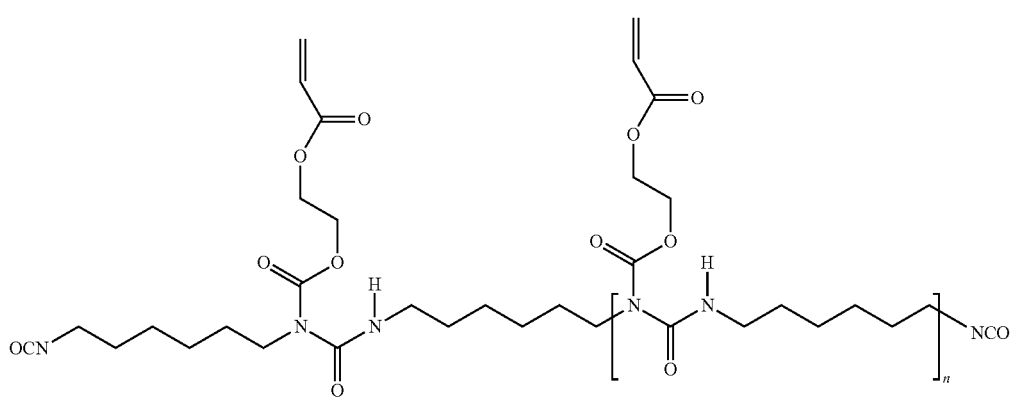

The oligomer may, for example, be generally obtained as Laromer (registered trademark) LR-9000 (made by BASF).

The compound (A) may be used alone or in combinations of two or more types. The amount of the compound (A) blended is, with respect to 100 parts by weight of the cycloolefin monomer, usually 0.1 to 100 parts by weight, preferably 1 to 50 parts by weight, more preferably 5 to 25 parts by weight. If in this range, the wettability of the carbon fiber by the polymerizable composition is good, the adhesion of the matrix resin and the carbon fiber is excellent, and the cost is also advantageous, so this is preferred.

Next, the case of using a combination of the compound (B1) which has an active hydrogen reactable group (hereinafter suitably referred to as the "compound (B1)") and the compound (B2) which has a carbon-carbon unsaturated bond (hereinafter suitably referred to as the "compound (B2)") will be explained.

The compound (B1) which is used in the present invention is a compound which has an active hydrogen reactable group in its molecule. As that compound (B1), usually a compound which has at least two active hydrogen reactable groups is used. The active hydrogen reactable groups are similar to those of the compound (A), and the preferable embodiments are also similar. That is, as the active hydrogen reactable group, an isocyanate group is particularly preferable. More specifically, the compound (B1) is preferably a polyfunctional isocyanate compound which contains at least two isocyanate groups in its molecule. As the polyfunctional isocyanate compound, for example, a polyfunctional nonblock type isocyanate compound or polyfunctional block type isocyanate compound etc. may be mentioned.

As the polyfunctional isocyanate compound, for example, toluene-2,4-diisocyanate, 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanate diphenylether, 4,4'-methylene bis(phenylene isocyanate) (MDI), durylene diisocyanate, tolylene diisocyanate, xylylene diisocyanate (XDI), 1,5-naphthalene diisocyanate, benzidine diisocyanate, o-nitrobenzidine diisocyanate, and 4,4'-diisocyanate dibenzyl, and other aromatic diisocyanate compounds; methylene diisocyanate, 1,4-tetramethylenediisocyanate, 1,6-hexamethylene diisocyanate, 1,10-decamethylene diisocyanate, and other aliphatic diisocyanate compounds; 4-cyclohexylene diisocyanate, 4,4'-methylene bis(cyclohexyl isocyanate), 1,5-tetrahydronaphthalene diisocyanate, isophoron diisocyanate, hydrated MDI, hydrated XDI, and other alicyclic diisocyanate compounds; etc. or polyurethane prepolymers obtained by reacting these diisocyanate compounds and low molecular weight polyols or polyamines to give isocyanate ends etc. may be mentioned. Further, known compounds used in the past which have polyfunctional isocyanate groups obtained by making these compounds isocyanurates, biurets, adducts, or polymerics may be used without particular limitation. As such, for example, a 2,4-tolylene diisocyanate dimer, triphenyl methane triisocyanate, tris-(p-isocyanate phenyl)thiophosphate, polyfunctional aromatic isocyanate compounds, polyfunctional aromatic aliphatic isocyanate compounds, polyfunctional aliphatic isocyanate compounds, fatty acid modified polyfunctional aliphatic isocyanate compounds, blocked polyfunctional aliphatic isocyanate compounds, and other polyfunctional block type isocyanate compounds, polyisocyanate prepolymers, etc. may be mentioned. Among these, from the ready availability and excellent ease of handling, the polyfunctional nonblock type isocyanate compounds of aromatic diisocyanate compounds, aliphatic diisocyanate compounds, and alicyclic diisocyanate compounds are suitably used.

These compounds may be used alone or in combinations of two or more types.

Note that, a "polyfunctional block type isocyanate compound" is a compound made inert at ordinary temperature by reaction of at least two isocyanate groups in its molecule with an active hydrogen-containing compound. Such an isocyanate compound generally has a structure where the isocyanate groups are masked by alcohols, phenols, $\epsilon$-caprolactam, oximes, active methylene compounds, and other blocking agents. A polyfunctional block type isocyanate compound generally does not react at ordinary temperature, so is excellent in storage stability, but normally by heating at 140 to 200° C., the isocyanate groups are regenerated and excellent reactivity can be exhibited.

The compound (B1) has an active hydrogen reactable group in its molecule which forms a chemical bond with the jointly used compound (B2), preferably a hydroxyl group present in the compound (B2), a hydroxyl group on the surface of the carbon fiber explained later, and a hydroxyl group of the cycloolefin polymer, etc. and as a result acts to improve the adhesion between the cycloolefin polymer and the carbon fiber.

The amount of the compound (B1) which is blended in the polymerizable composition of the present invention is, with respect to 100 parts by weight of the cycloolefin monomer, usually 0.1 to 100 parts by weight, preferably 1 to 50 parts by weight, more preferably 5 to 25 parts by weight. If in this range, it is possible to control the strength and heat resistance of the resin while achieving adhesion of the carbon fiber and resin, so this is preferred.

Further, the compound (B2) which is used together with the above-mentioned compound (B1) is a compound which has a carbon-carbon unsaturated bond. As such a compound (B2), usually a compound which simultaneously has a carbon-carbon unsaturated bond and hydroxyl group in its molecule is used. The carbon-carbon unsaturated bond forming the compound (B2) is similar to that of the above-mentioned compound (A), and the preferred embodiments are also similar.

The compound which has a carbon-carbon unsaturated bond and a hydroxyl group which is used as the compound (B2) is believed to act to improve the adhesion between the matrix resin of the cycloolefin polymer and the carbon fiber by having its carbon-carbon unsaturated bond chemically bond with a cross-linkable carbon-carbon unsaturated bond of the cycloolefin polymer or for example having its hydroxyl group chemically bond with an isocyanate group of the polyfunctional isocyanate compound as the compound (B1).

In the compound which has a carbon-carbon unsaturated bond and a hydroxyl group, it is sufficient that there be at least one carbon-carbon unsaturated bond and one hydroxyl group present. If there are a plurality present, these may be the same in type or may be different in type. Note that the numbers of carbon-carbon unsaturated bonds and hydroxyl groups present in the compound are usually 1 to 20, preferably 1 to 10.

The compound (B2) may be a single molecule or a polymer.

In the present invention, all compounds which have both a carbon-carbon unsaturated bond and hydroxyl group are the "compound (B2)". The compound (B2), for example, sometimes functions as a monomer, is taken into the cycloolefin polymer, and, as a result, a cycloolefin polymer which has the carbon-carbon unsaturated bond and hydroxyl group which had been present as the compound (B2) can be obtained. Further, the hydroxyl group is believed to act to improve the adhesion between the matrix resin of the cycloolefin polymer and the carbon fiber by, for example, chemically bonding with the isocyanate group of polyfunctional isocyanate compound as the compound (B1).

As the compound (B2), a compound which has a cross-linkable carbon-carbon unsaturated bond and a hydroxyl group is preferable. A "cross-linkable carbon-carbon unsaturated bond" is explained above. Its preferable embodiments are also similar. Note that, as a vinylidene group, for example, a (meth)acryl group may be mentioned. A methacryl group is preferable.

As the compound (B2) which is used in the present invention, for example, vinyl alcohol, allyl alcohol, oleyl alcohol, cis-13-dodecenol, and trans-9-octadecenol, and other unsaturated alcohols; norbornyl alcohol, 2-cyclohexen-1-ol, 2-cyclooctadien-1-ol, and p-vinyl phenol, and other alcohols which have an alicyclic structure; 2-hydroxyethyl acrylate, 2-hydroxyethyl methacrylate, 2-hydroxy-3-acryloxypropyl methacrylate, ethoxylated hydroxyethyl acrylate, ethoxylated hydroxyethyl methacrylate, polypropyleneglycol monomethacrylate, polypropyleneglycol monoacrylate, phenol acrylate, phenol methacrylate, bisphenol A type epoxy acrylate, novolac type epoxy acrylate, and brominated bisphenol A type epoxy acrylate, and other (meth)acrylics (meaning methacrylics or acrylics) which have one or more (meth)acryl groups and hydroxyl groups in their molecules; etc. may be mentioned.

These compounds may be used alone or in combinations of two or more types.

The amount of the compound (B2) which is blended into the polymerizable composition of the present invention is, with respect to 100 parts by weight of the cycloolefin monomer, usually 0.1 to 100 parts by weight, preferably 1 to 50 parts by weight, more preferably 5 to 25 parts by weight. If in this range, the wettability of the carbon fiber by the polymerizable composition is excellent, the adhesion of the matrix resin and carbon fiber is excellent, and the cost is advantageous, so this is preferred. Further, in a preferred embodiment, the ratio of presence of the active hydrogen reactable group of the compound (B1) and the hydroxyl group of the compound (B2) in the polymerizable composition of the present invention is, by value of the molar ratio (active hydrogen reactable group of compound (B1)/hydroxyl group of compound (B2)), usually 1 to 20, preferably 1 to 10, more preferably 1.5 to 5. As the active hydrogen reactable group, an isocyanate group is preferable. If in this range, the obtained cross-linked resin shaped article etc. are excellent in adhesion between the carbon fiber and matrix resin and are excellent also in economy, so are preferred.

Note that the above compound (A) and the compound (B1) and compound (B2) may also be jointly used.

(Other Additives)

Further, the polymerizable composition of the present invention may contain various additives in addition to the above, for example, a cross-linking aid, filler, chain transfer agent, polymerization reaction retardant, radical cross-linking retardant, reinforcing material, elastomer, antioxidant, flame retardant, coloring agent, photostabilizer, etc.

In the present invention, from the viewpoint of raising the cross-linking density and further improving the heat resistance in the obtained cross-linked resin shaped article, use of a cross-linking aid is preferable. A cross-linking aid is a polyfunctional compound which has two or more cross-linkable carbon-carbon unsaturated bonds which participate in a cross-linking reaction which is induced by the cross-linking agent. The cross-linkable carbon-carbon unsaturated bonds are preferably present in the compound forming the cross-linking aid as, for example, terminal vinylidene groups, in particular as isopropenyl groups or methacryl groups, more preferably as methacryl groups.

As specific examples of the cross-linking aid, p-diisopropenyl benzene, m-diisopropenyl benzene, o-diisopropenyl benzene, and other polyfunctional compounds which have two or more isopropenyl groups; ethylene dimethacrylate, 1,3-butylene dimethacrylate, 1,4-butylene dimethacrylate, 1,6-hexanediol dimethacrylate, polyethyleneglycol dimethacrylate, polyethyleneglycol dimethacrylate, ethyleneglycol di methacrylate, triethyleneglycol dimethacrylate, diethyleneglycol dimethacrylate, 2,2'-bis(4-methacryloxydiethoxyphenyl) propane, trimethylolpropane trimethacrylate, pentaerythritol trimethacrylate, and other polyfunctional compounds which have two or more methacryl groups, etc. may be mentioned. Among these, polyfunctional compounds which have two or more methacryl groups are preferable. Further, among the polyfunctional compounds which have two or more methacryl groups, in particular trimethylolpropane trimethacrylate, pentaerythritol trimethacrylate, and other polyfunctional compounds which have three methacryl groups are more preferable.

These cross-linking aids may be used alone or in combinations of two or more types.

The amount of the cross-linking aid which is blended into the polymerizable composition of the present invention is, with respect to 100 parts by weight of the cycloolefin monomer, usually 0.1 to 100 parts by weight, preferably 0.5 to 50 parts by weight, more preferably 1 to 30 parts by weight. Further, in the obtained cross-linked resin shaped article, from the viewpoint of maintaining a good balance of the impregnability of the matrix resin of the cycloolefin polymer into the carbon fiber, the adhesion of the matrix resin and the carbon fiber, mechanical strength, and heat resistance, the mixing ratio of the cross-linking aid and the compound (A) or compound (B2) is, by value of the weight ratio (cross-linking aid/compound (A) or compound (B2)), usually 0.001 to 1000, preferably 0.01 to 50, more preferably 0.04 to 6.

As the filler, it is possible to use any one which is known. The shape is not particularly limited. For example, a spherical shape, amorphous shape, rod shape, plate shape, hollow shape, etc. may be mentioned. Further, the material is also not particularly limited. For example, by adding the filler, it is possible to adjust the viscosity of the polymerizable composition and possible to improve the productivity and the work efficiency. For this purpose, for example, fumed silica, silica, calcium carbonate, magnesium oxide, talc, etc. are suitably used.

When blending a chain transfer agent into the polymerizable composition which is used in the present invention, the polymer which is obtained by the bulk polymerization becomes high in viscosity yet can be made excellent in resin flowability. Due to this, the cross-linkable resin shaped article of the present invention containing that polymer can, for example, be melt laminated when laminated with another material.

A chain transfer agent is a compound which can participate in the metathesis ring opening polymerization and which has one aliphatic carbon-carbon double bond which bonds with an end of a polymer obtained by subjecting the polymerizable composition of the present invention to a polymerization reaction. As an example of the double bond, a terminal vinyl group may be mentioned. A chain transfer agent may further have one or more cross-linkable carbon-carbon unsaturated bonds. In the present invention, compounds which have one aliphatic carbon-carbon double bond which bonds with an end of the polymer are all "chain transfer agents". For example, in the case of a compound which has two or more cross-linkable carbon-carbon unsaturated bonds, sometimes a similar function as with the above cross-linking aid is also exhibited, but if that compound is a compound which has one aliphatic carbon-carbon double bond which bonds with an end of the polymer, it falls under "chain transfer agents".

As specific examples of such chain transfer agent, 1-hexene, 2-hexene, styrene, vinylcyclohexane, allylamine, glycidyl acrylate, allylglycidyl ether, ethylvinyl ether, methylvinyl ketone, 2-(diethylamino)ethylacrylate, 4-vinyl aniline, and other chain transfer agents not having cross-linkable carbon-carbon unsaturated bonds; divinylbenzene, vinyl methacrylate, allyl methacrylate, styryl methacrylate, allyl acrylate, undecenyl methacrylate, styryl acrylate, ethyleneglycol diacrylate, and other chain transfer agents having one cross-linkable carbon-carbon unsaturated bond; allyl trivinylsilane, allylmethyl divinylsilane, and other chain transfer agents having two or more cross-linkable carbon-carbon unsaturated bonds, etc. may be mentioned. Among these, from the viewpoint of improving the mechanical strength of obtained cross-linked resin shaped article, ones having at least one cross-linkable carbon-carbon unsaturated bond are preferable, and ones having one cross-linkable carbon-carbon unsaturated bond are more preferable. Among these chain transfer agents, a chain transfer agent which has one vinyl group and one methacryl group is preferable, while vinyl methacrylate, allyl methacrylate, styryl methacrylate, undecenyl methacrylate, etc. are particularly preferable.

These chain transfer agents may be used alone or in combinations of two or more types. The amount of the chain transfer agent blended into the polymerizable composition of the present invention is, with respect to 100 parts by weight of the cycloolefin monomer, usually 0.01 to 10 parts by weight, preferably 0.1 to 5 parts by weight.

As the polymerization reaction retardants, for example, triphenylphosphine, tributylphosphine, trimethylphosphine, triethylphosphine, and other phosphines; and aniline, pyridine, and other Lewis bases; may be mentioned. Among these, phosphines are preferable, since they are able to efficiently control the usable time of the polymerizable composition of the present invention and do not obstruct the polymerization reaction much.

Further, among the cycloolefin monomers, monomers which have a 1,5-diene structure or 1,3,5-triene structure in their molecules also function as polymerization reaction retardants. As such compounds, 1,5-cyclooctadiene, 5-vinyl-2-norbornene, etc. may be mentioned.

As radical cross-linking retardants, alkoxyphenols, catechols, and benzoquinones may be mentioned. 3,5-di-t-butyl-4-hydroxyanisole and other alkoxyphenols are preferable.

As the reinforcing material, glass fiber and other inorganic reinforcing materials; and paper base materials and aramide fiber and other organic reinforcing materials etc. may be mentioned. As the elastomer, natural rubber, polybutadiene, polyisoprene, styrene-butadiene copolymer (SBR), styrene-butadiene-styrene block copolymer (SBS), styrene-isoprene-styrene copolymer (STS), ethylene-propylene-diene terpolymer (EPDM), ethylene-vinyl acetate copolymer (EVA), and hydrogenates of these etc. may be mentioned. As antioxidants, hindered phenol-based, phosphorus-based, amine-based, and other various plastic and rubber use antioxidants etc. may be mentioned. These antioxidants may be used alone, but use in a combination of two or more types is preferable.

As the flame retardant, a phosphorus-based flame retardant, nitrogen-based flame retardant, halogen-based flame retardant, aluminum hydroxide and other metal hydroxide-based flame retardants, or antimony trioxide and other antimony compounds, etc. may be mentioned. The flame retardant may be used alone, but use in a combination of two or more types is preferable.

As the coloring agent, a dye, pigment, etc. may be used. There are various types of dyes. Known ones may be suitably selected for use.

The polymerizable composition of the present invention may be prepared by mixing a cycloolefin monomer, metathesis polymerization catalyst, cross-linking agent, the compound (A) or a combination of the compound (B1) and compound (B2), and, if desired, other additives by a known method.

More specifically, for example, a metathesis polymerization catalyst is dissolved or dispersed in a suitable solvent to prepare a mixture (hereinafter sometimes referred to as a "catalyst solution"). Further, separately from this, the cycloolefin monomer is mixed with a cross-linking agent and the compound (A) etc. and, furthermore, a cross-linking aid, filler, flame retardant, or other additive as desired to prepare a mixture (below, sometimes referred to as a "monomer solution"). The catalyst solution may be added to the obtained monomer solution and the two stirred for preparation. The catalyst solution is preferably added right before the bulk polymerization. Further, a chain transfer agent, radical cross-linking retardant, etc. may be added to the monomer solution and/or catalyst solution before mixing the monomer solution and catalyst solution or may be added after mixing the monomer solution and catalyst solution.

[Cross-Linkable Resin Shaped Article]

The cross-linkable resin shaped article of the present invention is obtained by impregnating carbon fiber with the polymerizable composition of the present invention and then bulk polymerizing the polymerizable composition.

The carbon fiber which is used in the present invention is not particularly limited. For example, any acryl-based, pitch-based, rayon-based, or other various types of carbon fiber which is produced by conventional known methods may be used. Among these, PAN-based carbon fiber which is produced using polyacrylonitrile fiber as a raw material is preferably used since it does not obstruct the metathesis ring opening polymerization reaction and can improve the mechanical strength and heat resistance and other properties in the obtained cross-linked resin shaped article.

The more rigidity carbon fiber can maintain the higher its modulus of elasticity, so the carbon fiber-reinforced composite material is preferably made thin. On the other hand, if the modulus of elasticity is too high, the tensile elongation sometimes falls. As the carbon fiber, one which has a tensile modulus of elasticity by a resin-impregnated strand tensile test (JIS R-7601) of 200 to 400 GPa in range is preferable, while one of 220 to 300 GPa in range is more preferable. Further, as the carbon fiber, one with a high tensile elongation is preferable. The tensile elongation is preferably 1.7% or more, more preferably 1.85% or more, particularly preferably 2% or more. The tensile elongation does not have any particular upper limit, but it is usually 2.5% or less. The tensile elongation of carbon fiber can be measured by the above resin-impregnated strand tensile test. The higher the tensile elongation of the carbon fiber, the stronger and easier to handle the fiber and the higher the mechanical strength of the obtained cross-linked resin shaped article, so this is preferred.

From the viewpoint of better improving the adhesion of the carbon fiber with the matrix resin, the surface of the carbon fiber preferably has at least a suitable amount of carboxyl groups or hydroxyl groups or other active hydrogen-containing groups present. The amount of the active hydrogen-containing groups of the carbon fiber can be quantified by the surface oxygen concentration (O/C) measured by X-ray photoelectron spectroscopy. The amount of the active hydrogen-containing groups of carbon fiber is preferably 0.02 to 0.2 by O/C. If in this range, the action of the active hydrogen reactable groups contained in the compound (A) or compound (B1) to the carbon fiber rises and the extent of oxidation of the carbon fiber surface is also suitable, so this is preferred. The amount of the active hydrogen-containing groups of carbon fiber is, by O/C, more preferably 0.04 to 0.15, further preferably 0.06 to 0.1.

The method of introduction of the active hydrogen-containing groups into the carbon fiber is not particularly limited. A usually used method may be suitably employed. There are the ozone method and electrolytic oxidation in an acid solution etc., but preferably an oxidation reaction in a solution is used since it is superior economically. At this time, the amount of the active hydrogen-containing groups may be suitably adjusted by the amount of current, temperature, time spent in the acidic bath, acidity, etc.

The surface conditions of the carbon fiber are not particularly limited. The surfaces may be smooth or rough. Since an anchor effect can be expected, rough is preferable. The extent of roughness may be suitably selected. Roughness may be introduced to the carbon fiber surface, for example, at the same time as the above mentioned oxidation reaction in the solution.

The cross-sectional shape of the carbon fiber is not particularly limited, but it is preferably substantially circular. If the cross-sectional shape is circular, at the time of impregnation by the polymerizable composition, realignment of the filaments more easily occurs and the polymerizable composition can easily penetrate between the fibers. Further, there are the advantages that the thickness of the fiber bundles can be reduced and a cross-linkable resin shaped article with excellent drapeability can be easily obtained. Note that, the cross-sectional shape being "substantially circular" means that, when defining the ratio (R/r) of the radius R of the circumscribed circle and the radius r of the inscribed circle as the "deformation degree", the deformation degree is 1.1 or less.

The length of the carbon fiber may be suitably selected in accordance with the application. Either staple fiber or continuous fiber may be used. From the viewpoint of increasing the mechanical strength of the obtained cross-linked resin shaped article more, the length of the carbon fiber is usually 1 cm or more, preferably 2 cm or more, more preferably 3 cm or more. In particular, use of a continuous fiber of carbon fiber is preferable.

Further, the form of the carbon fiber which is used in the present invention is not particularly limited. It may be suitably selected from a unidirectional material in which the carbon fiber is aligned in one direction, a woven fabric, nonwoven fabric, matte, knit, string, roving, chopped strands, etc. Among these, a unidirectional material, woven fabric, roving, and other continuous fibers are preferable, while a unidirectional material is more preferable. A unidirectional material is preferable in that the impregnability by the polymerizable composition is greatly improved. Further, the ratio of the fiber is high, so the mechanical strength of the obtained cross-linked resin shaped article can be greatly improved.

As the form of the woven fabric, a conventional known one can be utilized. For example, a flat weave, sateen weave, twill weave, triaxial weave, and all other woven structures where the fibers crisscross can be utilized. Further, as the form of the woven fabric, not only two-dimensional fabrics, but also stitched woven fabrics and 3D woven fabrics which are reinforced by fibers in the thickness direction may be utilized.

When using carbon fiber in the form of woven fabrics etc., usually it is used as bundled yarn. The number of filaments in each bundled yarn is not particularly limited, but is preferably 1,000 to 100,000, more preferably 5,000 to 50,000, furthermore preferably 10,000 to 30,000 in range.

The carbon fiber which is used in the present invention does not have to be treated in advance with a sizing agent, but from the viewpoint of better improving the adhesion between the matrix resin of the cycloolefin polymer and the carbon fiber, it is preferable to use carbon fiber which has been treated in advance by a sizing agent.

The sizing agent is not particularly limited. A known one may be used. As the sizing agent, for example, at least one type selected from the group of an epoxy resin; urethane resin; vinyl ester resin; polyamide resin; nylon resin, polyethylene or polypropylene or other polyolefin resin; polyester resin; and phenol resin; may be mentioned. As the sizing agent, from the viewpoint of ready availability, at least one type selected from an epoxy resin, urethane resin, vinyl ester resin, and polyolefin resin is preferable, while an epoxy resin and/or vinyl ester resin is more preferable.

As specific examples of such a sizing agent, as products made by Matsumoto Yushi Seiyaku, KP-226, KP-0110, KP-136, KP-300, KP-752, KP-1005, and other sizing agents made from an epoxy resin; KP-2816, KP-2817, KP-2807, KP-2820, KP-2821, and other sizing agents made from a urethane resin; KP-371, KP-372, and other sizing agents made from a vinyl ester resin; KP-1008 and other sizing agents made from a nylon resin; P-138 and other sizing agents made from a polyethylene resin; TPE-100, TPE-102, and other sizing agents made from a polypropylene resin; KP-880, KP-881, and other sizing agents made from a polyester resin; etc. may be mentioned.

The sizing agent may be deposited on the carbon fiber by bringing the sizing agent into contact with the carbon fiber. At that time, the sizing agent is preferably dispersed or dissolved in water or acetone or other organic solvent and used as a dispersion or solution. From the viewpoint of increasing the dispersability of the sizing agent and improving the solution stability, it is preferable to add a suitable surfactant to the dispersion or solution.

The amount of adhesion of the sizing agent on the carbon fiber, based on the total amount of the carbon fiber and sizing agent as 100 wt %, is usually 0.1 to 5 wt %, preferably 0.2 to 3 wt %, more preferably 0.5 to 2 wt %. If the amount of adhesion is in this range, suitable carbon fiber bundling ability is obtained, sufficient rubbing resistance of the carbon fiber is obtained, pilling due to mechanical rubbing etc. is suppressed, further, the impregnability by the cycloolefin monomer is improved, and the obtained cross-linked resin shaped article can be improved in mechanical strength.

The carbon fiber can be suitably brought into contact with the sizing agent by the roller dipping method, roller contact method, or other method generally used in industry. The carbon fiber is usually brought into contact with the sizing agent using a dispersion or solution of the sizing agent, so after the contact, the fiber may be sent to a drying process where the water or organic solvent contained in the dispersion or solution of the sizing agent is removed. The drying process may be performed by methods using hot air, a hot plate, rollers, various infrared heaters, etc. as heat media.

Note that, it is preferable to treat the carbon fiber with the sizing agent after introducing active hydrogen-containing groups to the surface of the carbon fiber and after introducing roughness.

As the method for producing the cross-linkable resin shaped article of the present invention, specifically (i) the method of casting or coating the polymerizable composition over an arbitrary member, laying carbon fiber on top, making the polymerizable composition impregnate the carbon fiber, then performing bulk polymerization, (ii) the method of pouring the polymerizable composition into a mold in which the carbon fiber is placed and then performing bulk polymerization, (iii) the method of preparing in advance carbon fiber impregnated with the polymerizable composition and then performing bulk polymerization, etc. may be mentioned.

According to the method (i), a sheet shaped or film shaped cross-linkable resin shaped article is obtained. Further, it is possible to obtain a laminate of any member with the cross-linkable resin shaped article. Here, the arbitrary member can function as a support member. As that member, one made of polyethylene terephthalate, polypropylene, polyethylene, polycarbonate, polyethylene naphthalate, polyarylate, nylon, and other resins; iron, stainless steel, copper, aluminum, nickel, chromium, gold, silver, and other metal materials; etc. may be mentioned. The shape of such a member is not particularly limited, but use of a metal foil or resin film is preferable. For example, the thickness of the metal foil or resin film, from the viewpoints of the work efficiency etc., is usually 1 to 150 μm, preferably 2 to 100 μm, more preferably 3 to 75 μm. The surfaces of these members are preferably smooth. Further, the surface of the metal foil is preferably treated for oxidation by plasma etc., treated for blackening or otherwise chemically treated, treated by a silane coupling agent or another coupling agent, and otherwise surface treated.

The method of pouring or casting the polymerizable composition on the member is not particularly limited. Spray coating method, dip coating method, roll coating method, curtain coating method, die coating method, slit coating method, and other known coating methods may be mentioned. The polymerizable composition can be impregnated in the carbon fiber by placing the carbon fiber on the member which has been coated with the polymerizable composition, optionally laying a protective film on top, then pressing down from above by a roller etc.

The bulk polymerization is started by heating the polymerizable composition to the temperature at which the metathesis polymerization catalyst functions. The method of heating the polymerizable composition to a predetermined temperature is not particularly limited. The method of heating by placement on a hot plate, the method of using a press for pressing while heating (hot pressing), the method of pressing by heated rollers, the method using a heating oven, etc. may be mentioned.

The thus obtained cross-linkable resin shaped article is usually obtained in a layered state. The thickness is usually 15 mm or less, preferably 10 mm or less, more preferably 5 mm or less.

According to the above method (ii), it is possible to obtain arbitrary shape of a cross-linkable resin shaped article. As the shape, a sheet shape, film shape, column shape, cylindrical shape, polygonal column shape, etc. may be mentioned.

As the mold used here, a conventionally known shaping mold, for example, a split structure, that is, a shaping mold having a core mold and a cavity mold, may be mentioned. Carbon fiber is placed in the cavity in advance, then the polymerizable composition is injected and bulk polymerization performed. The core mold and the cavity mold are fabricated so as to form cavities tailored to the shape of the targeted shaped article. Further, the shape, material, size, etc. of the shaping mold are not particularly limited. Furthermore, it is also possible to prepare glass sheets, metal sheets, or other sheet shaped molds and spacers of predetermined thicknesses, place the spacers between two sheet shaped molds to form a space between them, place the carbon fiber there in advance, then pour in the polymerizable composition for bulk polymerization to thereby obtain a sheet shaped or film shaped cross-linkable resin shaped article.

The filling pressure (charging pressure) when filling the polymerizable composition in a shaping mold is usually 0.01 to 10 MPa, preferably 0.02 to 5 MPa. If the filling pressure is too low, the transfer surfaces formed at the inner circumferential surface of the cavity will tend not to be transferred well, while if the filling pressure is too high, the shaping mold has to be raised in rigidity, so this is not economical. The mold clamping pressure is usually 0.01 to 10 MPa in range.

The above method (iii) is suitably used for obtain a sheet shaped or film shaped cross-linkable resin shaped article. For example, the polymerizable composition can be made to impregnate carbon fiber by coating a predetermined amount of the polymerizable composition on carbon fiber by spray coating method, dip coating method, roll coating method, curtain coating method, die coating method, slit coating method, or other known method, optionally placing a protective film over the top, then pressing from the top side by a roller etc. By impregnating the polymerizable composition in the carbon fiber, then heating the impregnated material to a predetermined temperature, the polymerizable composition is made to polymerize by bulk polymerization and the desired cross-linkable resin shaped article is obtained.

The polymerizable composition has a lower viscosity compared with the polymer varnish comprised of an epoxy resin etc. dissolved in a solvent, used in the past for the production of a prepreg etc., and is excellent in impregnability of carbon fiber, so the resin obtained by the polymerization can be uniformly impregnated into the carbon fiber. The polymer forming the resin is substantially free of cross-linked structures and, for example, can be dissolved in toluene. The molecular weight of the polymer is, by weight average molecular weight measured by gel permeation chromatography (eluting solution: tetrahydrofuran) and converted to polystyrene, usually 1,000 to 1,000,000, preferably 5,000 to 500,000, more preferably 10,000 to 100,000 in range.

Usually, the polymerizable composition has little content of solvents etc. not participating in the reaction, so removal of the solvent after impregnating the carbon fiber and other such steps are unnecessary, the productivity is excellent, and no odor or blistering etc. occur due to residual solvent.

In each of the methods of the above (i), (ii), and (iii), the heating temperature for causing polymerization of the polymerizable composition is usually 50 to 250° C., preferably 80 to 200° C., more preferably 90 to 150° C. in range and is usually the one-minute half-life temperature of a radical generator or less, preferably 10° C. or more below the one-minute half-life temperature, more preferably 20° C. or more below the one-minute half-life temperature. Further, the polymerization time may be suitably selected, but is usually 10 seconds to 60 minutes, preferably within 20 minutes. By heating the polymerizable composition under these conditions, a cross-linkable resin shaped article with little unreacted monomer is obtained, so this is preferable.

The cross-linkable resin shaped article of the present invention is a carbon fiber-reinforced composite material having a post-cross-linkable thermoplastic resin containing a cross-linking agent as a matrix resin. Note that the cross-linkable resin shaped article of the present invention may also have part of the component resin cross-linked. For example, when bulk polymerizing the polymerizable composition in a mold, since it is hard to dissipate the heat of the polymerization reaction at the center part in the mold, the temperature will sometimes become too high at parts of the inside of the mold. At the high temperature parts, a cross-linking reaction will sometimes occur resulting in cross-linking. However, if the surface part where heat is easily dissipated is formed by a post-cross-linkable resin, the effect as the cross-linkable resin shaped article of the present invention can be sufficiently enjoyed.

In the present invention, the bulk polymerization reaction of the polymerizable composition proceeds substantially completely, so the cross-linkable resin shaped article of the present invention is substantially free of residual monomer. The work environment is not degraded by the odor derived from the monomer. Further, the polymerization reaction is not liable to proceed during storage. Furthermore, the cross-linkable resin shaped article of the present invention contains a radical generator or other cross-linking agent, but so long as not heating it to the temperature at which the cross-linking reaction occurs or higher, change in the surface hardness and other inconveniences will not occur and storage stability will remain excellent. Further, if using a cross-linking agent, in particular a radical generator, with a high decomposition temperature, at the time of cross-linking, the resin forming the cross-linkable resin shaped article will suitably flow and good adhesion with metal or other member will be realized.

The cross-linkable resin shaped article of the present invention is, for example, suitably used as a prepreg for the production of the cross-linked resin shaped article and laminate of the present invention. The content of the carbon fiber in the cross-linkable resin shaped article of the present invention is usually 0.1 to 99 wt %, preferably 10 to 80 wt %.

[Cross-Linked Resin Shaped Article]

The cross-linked resin shaped article of the present invention is comprised of the cross-linkable resin shaped article of the present invention explained above which is further cross-linked. The cross-linkable resin shaped article may be cross-linked by maintaining the shaped article at above the temperature where the cross-linkable resin (polymer of cycloolefin monomer) forming the cross-linkable resin shaped article of the present invention undergoes a cross-linking reaction. The heating temperature is usually the temperature at which a cross-linking reaction is induced by the cross-linking agent or more. For example, when using a radical generator as the cross-linking agent, usually the temperature is the one-minute half-life temperature or more, preferably 5° C. or more higher than the one-minute half-life temperature, more preferably 10° C. or more higher than the one-minute half-life temperature. Typically, it is 100 to 300° C., preferably 150 to 250° C. in range. The heating time is 0.1 to 180 minutes, preferably 0.5 to 120 minutes, more preferably 1 to 60 minutes in range.

Note that the cross-linked resin shaped article of the present invention may also be produced by suitably maintaining the polymerizable composition of the present invention at least at the temperature where the cross-linkable resin undergoes a cross-linking reaction, specifically by maintaining it at the above heating temperature for the above heating time, and thereby making the metathesis ring-opening polymerization of the cycloolefin monomer and the cross-linking reaction in the cycloolefin polymer occurring due to that polymerization proceed together.

[Laminate]

The laminate of the present invention comprises at least the cross-linkable resin shaped articles or the cross-linked resin shaped articles stacked together. This laminate may have layers of other than these shaped articles so long as in the range not impairing the expression of the advantageous effects of the present invention.

As the laminate containing the cross-linkable resin shaped articles of the present invention, for example, the cross-linkable resin shaped article composite obtained by the above method (i) may be mentioned. In that method, for example, if making the other member a separately obtained cross-linkable resin shaped article, it is possible to obtain a laminate of cross-linkable resin shaped articles stacked with each other.

As the laminate containing the cross-linked resin shaped article of the present invention, for example, a cross-linked resin shaped article composite which is comprised of a cross-linked resin shaped article and other members, obtained by cross-linking the cross-linkable resin shaped article composite by the method of (i), may be mentioned. Further, when the cross-linkable resin shaped article is a sheet shaped or film shaped article, the shaped articles may be stacked with each other or the shaped articles may be stacked with any other members and hot pressed to form a cross-linked resin shaped article and thereby obtain the laminate of the present invention. The pressure at the time of hot pressing is usually 0.5 to 20 MPa, preferably 3 to 10 MPa. The hot pressing may be performed in a vacuum or under a reduced pressure atmosphere. The hot pressing can be performed by a known press machine having a sheet forming press mold or a press forming machine for sheet mold compounds (SMC) or bulk mold compounds (BMC).

The cross-linked resin shaped article and laminate of the present invention are excellent in impregnability of the matrix resin. they are excellent in adhesion of the matrix resin and carbon fiber, high in mechanical strength, and excellent in heat resistance as well and also are excellent in electrical characteristics and can be suitably used as a carbon fiber-reinforced composite material.

Other Embodiments

Note that the above polymerizable composition of the present invention may also contain carbon fiber in advance in addition to the cycloolefin monomer, metathesis polymerization catalyst, cross-linking agent, the compound (A) or combination of the compound (B1) and compound (B2), and the optionally used other additives. In this case, as the carbon fiber, one similar to the above may be used. Further, in the same way as the above, a sizing agent may be deposited in advance.

Further, as the method of preparation of the polymerizable composition when impregnating the carbon fiber with a polymerizable composition, for example, the method of mixing the ingredients forming the polymerizable composition other than the carbon fiber to prepare a preliminary composition, then impregnating this by any method into the carbon fiber may be mentioned.

By causing bulk polymerization of the thus obtained polymerizable composition containing carbon fiber, it is possible to obtain a cross-linkable resin shaped article. Note that, as the method of bulk polymerization of the polymerizable composition containing the carbon fiber, (A) the method of casting or coating the preliminary composition over arbitrary member, laying carbon fiber on top, making the preliminary composition impregnate the carbon fiber, then performing bulk polymerization, (B) the method of pouring the preliminary composition into a mold in which the carbon fiber is placed and then performing bulk polymerization, (C) the method of preparing in advance carbon fiber impregnated with the preliminary composition and then performing bulk polymerization, etc. may be mentioned. Note that these methods (A), (B), and (C) may be performed in the same way as the above methods (i), (ii), and (iii).

EXAMPLES

Below, examples and comparative examples will be used to explain the present invention in further detail, but the present invention is not limited to these examples. Note that the parts and percentages in the examples and comparative examples are based on mass unless otherwise indicated.

The properties of the examples and comparative examples were measured and evaluated in accordance with the following methods:

(1) Impregnability of Matrix Resin

A cross-linkable resin shaped article (prepreg; 100 mm×100 mm) was observed visually at any one cross-section. The following evaluation criteria was used to evaluate the impregnability of the matrix resin in the carbon fiber. Note that the cross-linked resin shaped article and laminate which were obtained from a cross-linkable resin shaped article excellent in impregnability are also excellent in impregnability.

(Evaluation Criteria)
A: 3 or less voids. Impregnability extremely excellent.
B: 4 to 10 voids. Impregnability good.
C: 11 or more voids. Impregnability poor.

(2) Adhesion of Matrix Resin and Carbon Fiber

The laminate was bent to break it, then any three locations of the fractured face were observed by a scan-type electron microscope (SEM). The following evaluation criteria was used to evaluate the adhesion between the matrix resin and carbon fiber.

(Evaluation Criteria)
A: Surface parts of carbon fiber not clearly observed, only parts where matrix resin adhered to (deposited on) carbon fiber observed.
B: Surface parts of carbon fiber clearly observed, parts where matrix resin not confirmed to be adhered to carbon fiber recognized at only one location of three observed locations.
C: Surface parts of carbon fiber clearly observed, parts where matrix resin not confirmed to be adhered to carbon fiber recognized at all three observed locations.

(3) Bending Strength

A method based on JIS K7074 was used to measure the bending strength of the laminate. The following evaluation criteria was used to evaluate the bending strength of the laminate.

(Evaluation Criteria)
A: Bending strength of 650 MPa or more
B: Bending strength of 550 MPa to less than 650 MPa
C: Bending strength of less than 550 MPa (4) Glass Transition Point (Tg)

From the laminate, a strip shaped test piece (thickness 250 µm, width 4 mm×length 35 mm) was cut out to obtain a test piece for measurement use. The obtained test piece was measured by a dynamic viscoelasticity tester EXSTAR DMS6100, made by Seiko Instruments). The Tg was found from the peak value of the tan δ. The following evaluation criteria was used to evaluate the Tg of the laminate. The higher the Tg, the higher and better the heat resistance of the laminate.

(Evaluation Criteria)
A: 180° C. or more
B: 170° C. to less than 180° C.
C: Less than 170° C.

Example 1

In a glass flask, benzylidene(1,3-dimesityl-4-imidazolidin-2-ylidene) (tricyclohexylphosphine) ruthenium dichloride 51 parts and triphenylphosphine 79 parts were dissolved in toluene 952 parts to prepare a catalyst solution.

Further, separately from the above, a polyethylene bottle was charged with a cycloolefin monomer comprised of DCP (dicyclopentadiene) 90 parts and TCD (tetracyclododecene) 10 parts, then was charged and stirred with fumed silica 2 parts. After this, a chain transfer agent comprised of allyl methacrylate 0.74 part, a cross-linking agent comprised of di-t-butyl peroxide [one-minute half-life temperature 186° C.; Kayabutyl D registered trademark), made by Kayaku Akzo] 3 parts, a cross-linking aid comprised of TMP (trimethylolpropane trimethacrylate) 10 parts, and a compound (A) comprised of MOI (methacryloxyethyl isocyanate; Karenz MOI (registered trademark), made by Showa Denko) 20 parts were added and mixed to obtain a monomer solution. Next, the catalyst solution prepared above was added to the above monomer solution at a ratio of 0.12 ml per 100 g of the cycloolefin monomer. The mixture was stirred to prepare the polymerizable composition. Note that the value of the weight ratio of cross-linking aid/compound (A) was 0.5.

Next, the obtained polymerizable composition 100 parts was cast over a polyethylene naphthalate film (Type Q51, thickness 75 µm, made by Teijin Dupont Film), then this was overlaid with a flat weave cloth of carbon fiber [Pyrofil fabric (TR3110M), was treated by sizing agent (epoxy resin); made by Mitsubishi Rayon], then was cast over with the polymerizable composition 80 parts. From the above, further, a polyethylene naphthalate film was covered, then a roller was used to make the polymerizable composition impregnate the entire flat weave cloth. Next, this was allowed to stand in a heating oven heated to 95° C. for 1 minute to cause bulk polymerization of the polymerizable composition whereby a thickness 0.25 mm cross-linkable resin shaped article (prepreg) was obtained.

This prepreg was cut to a size of 100 mm square, then the polyethylene phthalate film was peeled off. Eight of these were stacked, then hot pressed by 3 MPa at 200° C. for 15 minutes to obtain a laminate comprised of the cross-linked resin shaped articles stacked up. The obtained cross-linkable resin shaped article and laminate were evaluated for the above properties. The results are shown in Table 1.

Example 2

Except for using, as the compound (A), GMA (glycidyl methacrylate), the same procedure was performed as in Example 1 to obtain and evaluate a cross-linkable resin shaped article and laminate. The results are shown in Table 1.

Example 3

Except for not using a cross-linking aid, the same procedure was performed as in Example 1 to obtain and evaluate a cross-linkable resin shaped article and laminate. The results are shown in Table 1.

Example 4

The flat weave cloth of carbon fiber which was used in Example 1 was allowed to stand in an acetone bath for one hour so that the sizing agent which was deposited on the surface was removed by the acetone, then the cloth was allowed to stand for 24 hours at room temperature to make it dry. After that, the cloth was further made to dry at 80° C. for 5 hours. The rate of deposition of the sizing agent at the cloth after the operation for removing the sizing agent was less than 0.1%. This cloth was coated with a sizing agent (vinyl ester resin; KP-371, made by Matsumoto Yushi Seiyaku) to a deposition amount of 1% and allowed to dry in a 120° C. oven for 15 minutes to obtain a flat weave cloth of carbon fiber treated by a sizing agent (vinyl ester resin). Except for using this cloth, the same procedure was performed as in Example 1 to obtain and evaluate a cross-linkable resin shaped article and laminate. The results are shown in Table 1.

Example 5

Except for using, as the compound (A), Laromer (registered trademark) LR-9000 (made by BASF) 20 parts, the same procedure was performed as in Example 1 to obtain and evaluate a cross-linkable resin shaped article and laminate. The results are shown in Table 1.

Comparative Example 1

Except for not using the compound (A), the same procedure was performed as in Example 3 to obtain and evaluate a cross-linkable resin shaped article and laminate. The results are shown in Table 1.

Comparative Example 2

Except for using a flat weave cloth of carbon fiber after removing the sizing agent, the same procedure was performed as in Comparative Example 1 to obtain and evaluate a cross-linkable resin shaped article and laminate. The results are shown in Table 1. Note that the sizing agent was removed in the same way as in Example 4.

Comparative Example 3

Except for using, instead of the compound (A), MMA (methyl methacrylate), the same procedure was performed as in Example 3 to obtain and evaluate a cross-linkable resin shaped article and laminate. The results are shown in Table 1.

Comparative Example 4

Except for using, instead of the compound (A), MMA (methyl methacrylate), the same procedure was performed as in Example 1 to obtain and evaluate a cross-linkable resin shaped article and laminate. The results are shown in Table 1.

TABLE 1

| | | Example | | | | |
|---|---|---|---|---|---|---|
| | | 1 | 2 | 3 | 4 | 5 |
| Formulation (parts) | | | | | | |
| Monomer | DCP/TCD | 90/10 | 90/10 | 90/10 | 90/10 | 90/10 |
| Cross-linking agent | Di-t-butyl peroxide | 3 | 3 | 3 | 3 | 3 |
| Compound (A) | Methacryloxyethyl isocyanate | 20 | — | 20 | 20 | — |
| | Glycidyl methacrylate | — | 20 | — | — | — |
| | Oligomer (LR-9000) | — | — | — | — | 20 |
| | Methyl methacrylate | — | — | — | — | — |
| Chain transfer agent | Allyl methacrylate | 0.74 | 0.74 | 0.74 | 0.74 | 0.74 |
| Cross-linking aid | Trimethylolpropane trimethacrylate | 10 | 10 | — | 10 | 10 |
| Type of sizing agent | | Epoxy resin | Epoxy resin | Epoxy resin | Vinyl ester resin | Epoxy resin |
| Results of evaluation | | | | | | |
| Impregnability | | A | B | A | A | A |
| Adhesion | | A | B | B | A | A |
| Bending strength | | A | B | B | A | A |
| Tg | | A | B | B | A | A |

| | | Comparative Example | | | |
|---|---|---|---|---|---|
| | | 1 | 2 | 3 | 4 |
| Formulation (parts) | | | | | |
| Monomer | DCP/TCD | 90/10 | 90/10 | 90/10 | 90/10 |
| Cross-linking agent | Di-t-butyl peroxide | 3 | 3 | 3 | 3 |

TABLE 1-continued

| Compound (A) | Methacryloxyethyl isocyanate | — | — | — | — |
|---|---|---|---|---|---|
|  | Glycidyl methacrylate | — | — | — | — |
|  | Oligomer (LR-9000) | — | — | — | — |
|  | Methyl methacrylate | — | — | 20 | 20 |
| Chain transfer agent | Allyl methacrylate | 0.74 | 0.74 | 0.74 | 0.74 |
| Cross-linking aid | Trimethylolpropane trimethacrylate | — | — | — | 10 |
| Type of sizing agent |  | Epoxy resin | None | Epoxy resin | Epoxy resin |
| Results of evaluation |  |  |  |  |  |
| Impregnability |  | B | C | B | B |
| Adhesion |  | C | C | C | C |
| Bending strength |  | C | C | C | B |
| Tg |  | C | C | C | C |

Evaluation of Examples 1 to 5 and Comparative Examples 1 to 4

From Table 1, it is learned that the laminates which were obtained in Examples 1 to 5 are excellent in impregnability of the matrix resin (cycloolefin polymer), adhesion of the matrix resin and carbon fiber, and bending strength, have a high Tg, and have excellent heat resistance. Further, regarding the improvement of the various properties, from a comparison of Example 1 and Example 2, it is learned that, as a compound (A), rather than using a compound which has a methacryl group and epoxy group, using a compound which has a methacryl group and isocyanate group is more effective and, from a comparison of Example 1 and Example 3, it is learned that using the cross-linking aid and the compound (A) in combination is more effective. On the other hand, it was learned that in Comparative Examples 1 to 4, which did not use the compound (A), the various properties were remarkably inferior to those of Examples 1 to 5.

Example 6

In a glass flask, benzylidene(1,3-dimesityl-4-imidazolidin-2-ylidene)(tricyclohexylphosphine) ruthenium dichloride 51 parts and triphenylphosphine 79 parts were dissolved in toluene 952 parts to prepare a catalyst solution.

Further, separately from the above, a polyethylene bottle was charged with a cycloolefin monomer comprised of DCP (dicyclopentadiene) 90 parts and TCD (tetracyclododecene) 10 parts, then was charged with a chain transfer agent comprised of allyl methacrylate 2 parts, a cross-linking agent comprised of di-t-butyl peroxide [one-minute half-life temperature 186° C.; Kayabutyl D (registered trademark), made by Kayaku Akzo] 3 parts, a cross-linking aid comprised of TMP (trimethylolpropane trimethacrylate) 10 parts, a compound (B1) comprised of xylylene diisocyanate [Takenate 500 (registered trademark), made by Mitsui Chemicals] 10 parts, and a compound (B2) comprised of 2-hydroxyethyl methacrylate [Lightester HO (registered trademark), made by Kyoeisha Chemical] 10 parts. These were mixed to obtain a monomer solution. Next, the catalyst solution prepared above was added to the above monomer solution at a ratio of 0.12 ml per 100 g of the cycloolefin monomer. The mixture was stirred to prepare the polymerizable composition. Note that the value of the molar ratio of the isocyanate groups of the compound (B1)/hydroxyl groups of the compound (B2) was 1.4. Further, the value of the weight ratio of the cross-linking aid/compound (B2) was 1.

Further, except for using the polymerizable composition obtained above, the same procedure was performed as in Example 1 to obtain a cross-linkable resin shaped article and laminate. The results are shown in Table 2.

Example 7

Except for using, as the compound (B2), 2-hydroxy-3-acryloyloxypropyl methacrylate (Lightester G201 P, made by Kyoeisha Chemical) 5 parts, the same procedure was performed as in Example 6 to obtain and evaluate a cross-linkable resin shaped article and laminate. The results are shown in Table 2. Note that the value of the molar ratio of the isocyanate groups of the compound (B1)/hydroxyl groups of the compound (B2) was 4.6. Further, the value of the weight ratio of the cross-linking aid/compound (B2) was 2.

Example 8

Except for not using the cross-linking aid, the same procedure was performed as in Example 6 to obtain and evaluate a cross-linkable resin shaped article and laminate. The results are shown in Table 2.

Example 9

Except for using, as the cycloolefin monomer, DCP (dicyclopentadiene) 90 parts and TCD (tetracyclododecene) 5 parts and using, as the compound (B2), hydroxynorbornene 5 parts, the same procedure was performed as in Example 6 to obtain and evaluate a cross-linkable resin shaped article and laminate. The results are shown in Table 2. Note that the value of the molar ratio of the isocyanate groups of the compound (B1)/hydroxyl groups of the compound (B2) was 2.3. The value of the weight ratio of the cross-linking aid/compound (B2) was 2.

Comparative Example 5

Except for not using the cross-linking aid, compound (B1), and compound (B2), the same procedure was performed as in Example 6 to obtain and evaluate a cross-linkable resin shaped article and laminate. The results are shown in Table 2.

Comparative Example 6

Except for using a flat weave cloth of carbon fiber after removing the sizing agent, the same procedure was performed as in Comparative Example 5 to obtain and evaluate a cross-linkable resin shaped article and laminate. The results are shown in Table 2. Note that the sizing agent was removed in the same way as Example 4.

Comparative Example 7

Except for not using the cross-linking aid and compound (B2), the same procedure was performed as in Example 6 to obtain and evaluate a cross-linkable resin shaped article and laminate. The results are shown in Table 2.

Comparative Example 8

Except for using, instead of the compound (B2), MMA (methyl methacrylate), the same procedure was performed as in Example 6 to obtain and evaluate a cross-linkable resin shaped article and laminate. The results are shown in Table 2.

Evaluation of Examples 6 to 9 and Comparative Examples 5 to 8

From Table 2, it is learned that the cross-linkable resin shaped articles which were obtained at Examples 6 to 9 are excellent in impregnability of the matrix resin to the carbon fiber and, further, that the laminates are excellent in adhesion of the matrix resin and carbon fiber, bending strength, and heat resistance. Further, regarding the improvement of the various properties, from a comparison of Example 6 and Example 8, it is learned that using the cross-linking aid and the compound (B1) and compound (B2) in combination is more effective. As opposed to this, it is learned that, in the laminates of Comparative Examples 5 to 8 not using the compound (B2), the adhesion of the matrix resin and the carbon fiber falls and that, furthermore, in Comparative Example 5 and Comparative Example 6, where not only the compound (B2), but also the compound (B1) is not used, the adhesion further falls.

TABLE 2

| | | Example | | | |
|---|---|---|---|---|---|
| | | 6 | 7 | 8 | 9 |
| Formulation (parts) | | | | | |
| Monomer | DCP/TCD | 90/10 | 90/10 | 90/10 | 90/5 |
| Cross-linking agent | Di-t-butyl peroxide | 3 | 3 | 3 | 3 |
| Compound (B1) | Xylylene diisocyanate | 10 | 10 | 10 | 10 |
| Compound (B2) | 2-hydroxyethyl methacrylate | 10 | — | 10 | — |
| | 2-hydroxy-3-acryloyloxypropyl methacrylate | — | 5 | — | — |
| | Hydroxynorbornene | — | — | — | 5 |
| | Methyl methacrylate | — | — | — | — |
| Chain transfer agent | Allyl methacrylate | 2 | 2 | 2 | 2 |
| Cross-linking aid | Trimethylolpropane trimethacrylate | 10 | 10 | — | 10 |
| Type of sizing agent | | Epoxy resin | Epoxy resin | Epoxy resin | Epoxy resin |
| Results of evaluation | | | | | |
| Impregnability | | A | A | A | A |
| Adhesion | | A | A | A | A |
| Bending strength | | A | A | B | B |
| Tg | | A | A | B | A |

| | | Comparative Example | | | |
|---|---|---|---|---|---|
| | | 5 | 6 | 7 | 8 |
| Formulation (parts) | | | | | |
| Monomer | DCP/TCD | 90/10 | 90/10 | 90/10 | 90/10 |
| Cross-linking agent | Di-t-butyl peroxide | 3 | 3 | 3 | 3 |
| Compound (B1) | Xylylene diisocyanate | — | — | 10 | 10 |
| Compound (B2) | 2-hydroxyethyl methacrylate | — | — | — | — |
| | 2-hydroxy-3-acryloyloxypropyl methacrylate | — | — | — | — |
| | Hydroxynorbornene | — | — | — | — |
| | Methyl methacrylate | — | — | — | 10 |
| Chain transfer agent | Allyl methacrylate | 2 | 2 | 2 | 2 |
| Cross-linking aid | Trimethylolpropane trimethacrylate | — | — | — | 10 |
| Type of sizing agent | | Epoxy resin | None | Epoxy resin | Epoxy resin |
| Results of evaluation | | | | | |
| Impregnability | | B | C | B | B |
| Adhesion | | C | C | B | B |
| Bending strength | | C | C | C | C |
| Tg | | C | C | C | B |

The invention claimed is:

1. A polymerizable composition which contains a cycloolefin monomer; a metathesis polymerization catalyst; a cross-linking agent; and
   (i) a compound (A) which has an aliphatic carbon-carbon unsaturated bond and an active hydrogen reactable group selected from the group consisting of lactone group, oxazoline group, carbodiimide group, aziridine group, isocyanate group, and halogen substituted silyl group, or
   (ii) a combination of a compound (B1) which has an active hydrogen reactable group and a compound (B2) which has an aliphatic carbon-carbon unsaturated bond and a hydroxyl group,
   wherein the compound (B2) is selected from the group consisting of unsaturated alcohols and (meth)acrylics which have one or more (meth)acryl groups and hydroxyl groups in their molecules, and the compound (B2) is not a polymer.

2. The polymerizable composition as set forth in claim 1, wherein the compound (B1) which has an active hydrogen reactable group is a compound which has at least two active hydrogen reactable groups.

3. The polymerizable composition as set forth in claim 1, wherein the active hydrogen reactable group of the compound (A) is an isocyanate group.

4. The polymerizable composition as set forth in claim 1, wherein the active hydrogen reactable group of the compound (B1) is an isocyanate group.

5. The polymerizable composition as set forth in claim 1, wherein a ratio of presence of the active hydrogen reactable group of the compound (B1) and the hydroxyl group of the compound (B2) is, by value of molar ratio (active hydrogen reactable groups of compound (B1)/hydroxyl groups of compound (B2)), 1 to 20.

6. The polymerizable composition as set forth in claim 1, further containing a cross-linking aid.

7. The polymerizable composition as set forth in claim 6, wherein a mixing ratio of the cross-linking aid and the compound (A) or the compound (B2) is, by value of weight ratio (cross-linking aid/compound (A) or compound (B2)), 0.001 to 1,000.

8. The polymerizable composition as set forth in claim 1, further containing a chain transfer agent.

9. The polymerizable composition as set forth in claim 1, further containing carbon fiber.

10. The polymerizable composition as set forth in claim 9, wherein the carbon fiber is deposited with a sizing agent in advance.

11. A cross-linkable resin shaped article obtained by impregnating the polymerizable composition as set forth in claim 1 in carbon fiber, then bulk polymerizing the same.

12. A cross-linkable resin shaped article obtained by bulk polymerizing the polymerizable composition as set forth in claim 9.

13. A cross-linked resin shaped article obtained by further cross-linking the cross-linkable resin shaped article as set forth in claim 11.

14. A cross-linked resin shaped article obtained by further cross-linking the cross-linkable resin shaped article as set forth in claim 12.

15. A laminate obtained by laminating at least the cross-linkable resin shaped article as set forth in claim 11.

16. A laminate obtained by laminating at least the cross-linkable resin shaped article as set forth in claim 12.

17. A laminate obtained by laminating at least the cross-linked resin shaped article as set forth in claim 13.

18. A laminate obtained by laminating at least the cross-linked resin shaped article as set forth in claim 14.

* * * * *